United States Patent
Kawanami et al.

(10) Patent No.: US 10,862,367 B2
(45) Date of Patent: Dec. 8, 2020

(54) STATOR OF ELECTRIC ROTARY MACHINE

(71) Applicant: HONDA MOTOR CO., LTD., Tokyo (JP)

(72) Inventors: Koji Kawanami, Saitama (JP); Fumiya Nishii, Saitama (JP); Tomotaka Iki, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 16/295,163

(22) Filed: Mar. 7, 2019

(65) Prior Publication Data
US 2019/0280542 A1 Sep. 12, 2019

(30) Foreign Application Priority Data
Mar. 12, 2018 (JP) .................................. 2018-044440

(51) Int. Cl.
*H02K 5/22* (2006.01)
*H02K 3/12* (2006.01)
(Continued)

(52) U.S. Cl.
CPC ............. *H02K 5/225* (2013.01); *B23K 26/22* (2013.01); *H01R 43/0228* (2013.01); *H02K 1/16* (2013.01);
(Continued)

(58) Field of Classification Search
CPC .. H02K 3/50; H02K 3/28; H02K 3/12; H02K 3/34; H02K 15/0068; H02K 15/00;
(Continued)

(56) References Cited

U.S. PATENT DOCUMENTS

| | | | |
|---|---|---|---|
| 2003/0137207 A1 | 7/2003 | Tamura et al. | |
| 2010/0102664 A1 | 4/2010 | Chen et al. | |
| 2011/0241461 A1* | 10/2011 | Utaka | H02K 3/12 310/71 |

FOREIGN PATENT DOCUMENTS

| | | |
|---|---|---|
| CN | 101820206 A | 9/2010 |
| JP | 2003-125564 A | 4/2003 |

(Continued)

OTHER PUBLICATIONS

Ermer Martin et al, Stator for an Electrical Machine, Feb. 15, 2018, Bosch GmbH, WO 2018028856 (English Machine Translation) (Year: 2018).*

(Continued)

*Primary Examiner* — Quyen P Leung
*Assistant Examiner* — Alexander A Singh
(74) *Attorney, Agent, or Firm* — Paratus Law Group, PLLC

(57) ABSTRACT

A stator of an electric rotary machine includes a first abutting portion and a second abutting portion. The first abutting portion and the second abutting portion are welded by laser welding in a state where the abutting portions abut against each other, and the first abutting portion and the second abutting portion include bonding surfaces which are bonded to each other. In the axial direction, a height from an insulating cover film to the bonding surface in one abutting portion is greater than a height from an insulating cover film to the bonding surface in the other abutting portion, and in a radial direction, a protruding distance from the insulating cover film to the bonding surface in the one abutting portion is greater than a retraction distance from the insulating cover film to the bonding surface in the other abutting portion.

6 Claims, 12 Drawing Sheets

(51) Int. Cl.
  *H02K 1/16* (2006.01)
  *H01R 43/02* (2006.01)
  *H02K 15/00* (2006.01)
  *B23K 26/22* (2006.01)
  *H02K 3/34* (2006.01)

(52) U.S. Cl.
  CPC .............. *H02K 3/12* (2013.01); *H02K 3/34* (2013.01); *H02K 15/0081* (2013.01); *H02K 2213/03* (2013.01)

(58) Field of Classification Search
  CPC ...... H02K 15/0081; H02K 1/16; H02K 5/225; H02K 2213/03; H01R 43/0228; B23K 26/22
  USPC .................... 310/184, 180, 201, 45, 208, 71
  See application file for complete search history.

(56) References Cited

FOREIGN PATENT DOCUMENTS

| | | |
|---|---|---|
| JP | 2003-219614 A | 7/2003 |
| JP | 2015-104249 A | 6/2015 |
| WO | WO-2018028856 A1 * | 2/2018 ............... H02K 3/12 |

OTHER PUBLICATIONS

Sep. 2, 2020, Chinese Office Action issued for related CN application No. 201910139825.4.

* cited by examiner

STATOR OF ELECTRIC ROTARY MACHINE

CROSS-REFERENCE TO RELATED APPLICATIONS

The present application claims the benefit of priority of Japanese Patent Application No. 2018-044440, filed on Mar. 12, 2018, the content of which is incorporated herein by reference.

TECHNICAL FIELD

The present disclosure relates to a stator of an electric rotary machine which is mounted on, for example, an electric automobile, a hybrid automobile or the like.

BACKGROUND ART

A stator of the electric rotary machine including a stator core and a coil formed with a winding wound around teeth of the stator core is known. In this winding type stator, due to a configuration in which windings are wound while pieces of insulating paper are inserted between the windings, the winding treatment is troublesome, and it is difficult to load windings into a predetermined shape.

In the manufacturing method of coil of an electric rotary machine described in JP-A-2003-125564, end portions of coil segments are welded after conducting wires of the coil segments are bent into a predetermined shape by rotating a holder whose recess of a ring shape holds a leading end of the conducting wire of the coil segment which is inserted into a stator core.

Further, in the method of bonding wirings of the electric rotary machine disclosed in JP-A-2003-219614, bonding end portions are subjected to TIG welding in a state where the bonding end portions of each of conductive bodies are restricted.

However, in the method of bonding wirings of an electric rotary machine disclosed in JP-A-2003-219614, a crossover height should be great in order to secure a sufficient distance from a cover film peeled portion. Thereupon, it is considered that abutting portions are welded by means of laser welding in place of TIG welding in a state where two end portions of conductive bodies abut against each other.

The laser welding requires high power when boding the end portions of the conductive bodies, but the length of time spent on the operation is short and the increase in temperature of conductive bodies is suppressed, and therefore it is possible to reduce the crossover height. However, in the laser welding, it is necessary to bring the end portions of the coil segments into exact contact with each other even if there is a dimensional error or an assembly error. That is, when the laser welding is performed in a state where the end portions of the coil segments are not brought into exact contact with each other, there is a worry that insulating cover film or the like may be damaged as the laser light can pass through between the end portions.

SUMMARY

An object of the invention is to provide a stator of an electric rotary machine which is capable of surely making end portions of conductive bodies, which is bonded by laser welding, abut against each other, and which is capable of preventing damages of members by laser light used for welding.

According to an aspect of the invention, there is provided a stator of an electric rotary machine including:

a stator core; and a coil which is inserted into each of a plurality of slots formed in the stator core, and includes a plurality of coil segments protruding outwardly in an axial direction of the stator core from the slot, wherein:

each of the plurality of coil segments includes a plurality of first coil segments and a plurality of second coil segments;

a first coil segment of the plurality of first coil segments includes an insertion portion inserted in the slot, and a protruding portion which protrudes outwardly in the axial direction more than an end surface of the axial direction of the stator core;

a second coil segment of the plurality of second coil segments includes an insertion portion inserted in the slot, and a protruding portion which protrudes outwardly in the axial direction more than the end surface:

an end portion of the protruding portion of the first coil segment includes a first abutting portion in which a conductive body is exposed from an insulating cover film;

an end portion of the protruding portion of the second coil segment includes a second abutting portion in which a conductive body is exposed from an insulating cover film;

the first abutting portion and the second abutting portion are welded by laser welding in a state where the abutting portions abut against each other;

the first abutting portion and the second abutting portion include bonding surfaces which are bonded to each other, and engaging surfaces which intersect with the bonding surfaces and engage each other;

one abutting portion of the first abutting portion and the second abutting portion is a concave portion formed in a surface opposite to another abutting portion;

the other abutting portion is a convex portion formed in a surface opposite to the one abutting portion:

in the axial direction, a height from the insulating cover film to the bonding surface in the other abutting portion is greater than a height from the insulating cover film to the bonding surface in the one abutting portion; and in a radial direction, a protruding distance from the insulating cover film to the bonding surface in the other abutting portion is greater than a retraction distance from the insulating cover film to the bonding surface in the one abutting portion.

Effects

According to the above, in the axial direction, as the height from the insulating cover film in the convex portion side abutting portion to the bonding surface is greater than the height from the insulating cover film in the concave portion side abutting portion to the bonding surface, even when there are dimensional error or assembly error, interference between the bonding surface of the convex portion side abutting portion and the engaging surface of the concave portion side abutting portion is prevented. Further, in the radial direction, as the protruding distance from the insulating cover film to the bonding surface in the convex portion side abutting portion is greater than the retraction distance from the insulating cover film to the bonding surface in the concave portion side abutting portion, the bonding surfaces certainly abut against each other even when the insulating cover films of the convex portion side abutting portion and the concave portion side abutting portion abut against each other. Therefore, it is possible to bond the first abutting portion and the second abutting portion by means of laser welding in a state of surely abutting against each other.

Further, as the first abutting portion of the first coil segment and the second abutting portion of the second coil segment include bonding surfaces which are bonded to each other, and engaging surfaces which intersect with the bonding surfaces and engage each other, it is possible to bond the first coil segment and the second coil segment in a state where their positions are determined. Further, as the engaging surface of any one of the first coil segment and the second coil segment also serves as a leakage preventing portion of laser light when the bonding surfaces are subjected to laser welding, it is possible to avoid negative effects of the laser light to other region.

DESCRIPTION OF EMBODIMENTS

Figure 1:
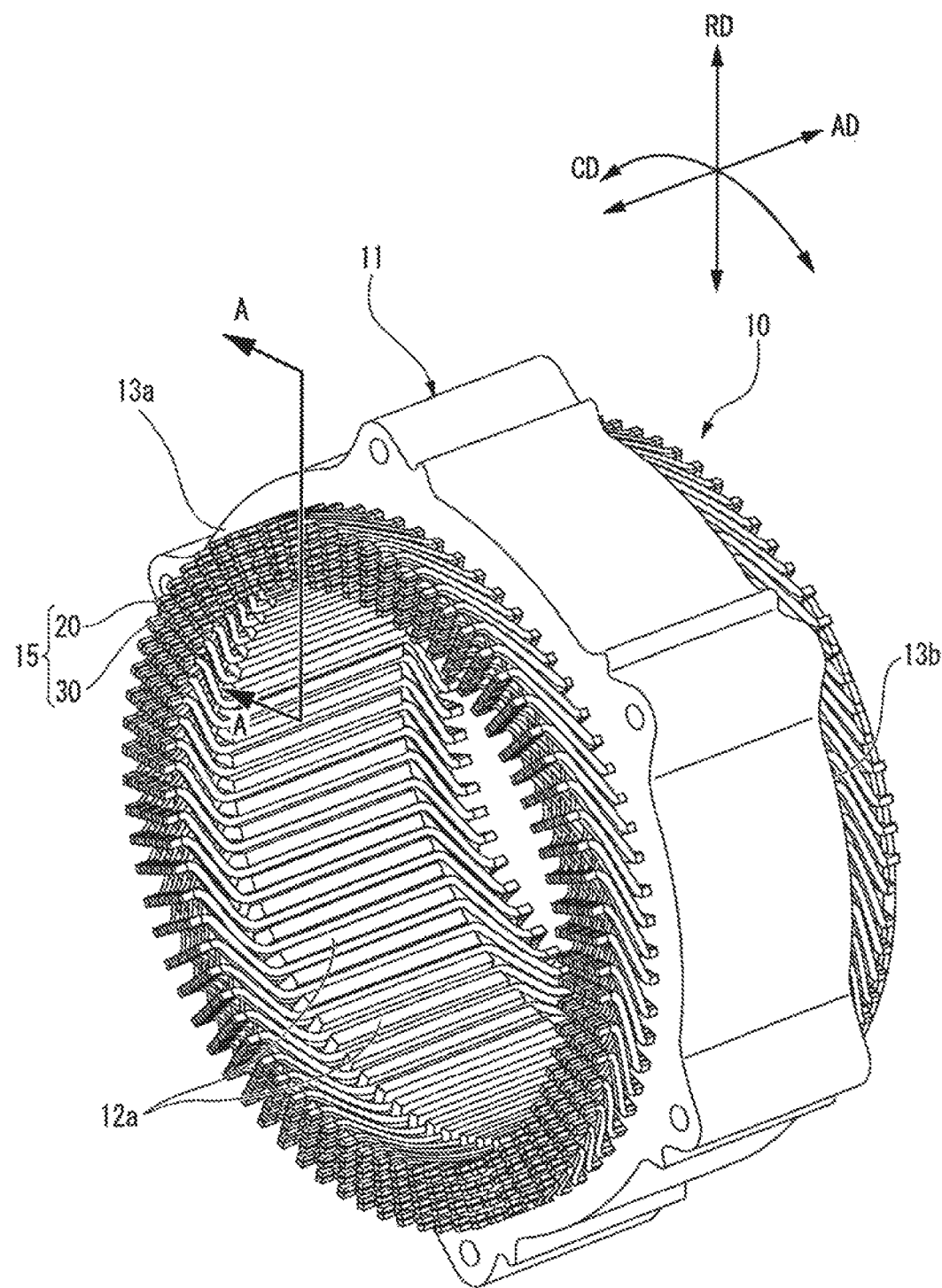
FIG. 1 is a perspective view of a stator of an electric rotary machine, which is an embodiment of the present invention.

Hereinafter, an embodiment of a stator of an electric rotary machine of the invention will be described with reference to the accompanying drawings. Further, in the drawings, a reference sign RD represents a radial direction of the stator, a reference sign AD represents an axial direction of the stator, and a reference sign CD represents a circumferential direction CD of the stator.

As illustrated in FIG. 1, a stator 10 of an electric rotary machine includes a stator core 11 and a coil 15.

The stator core 11 is a member of an annular shape, which is, for example, configured by stacking a plurality of electromagnetic steel sheets of an annular shape. The stator core 11 includes a plurality of slots 12 disposed on an inner circumferential surface thereof at an equal interval of distance along the circumferential direction CD of the stator core 11.

The slot 12 is formed with a groove extending from an end surface 13a on one side in the axial direction AD of the stator core 11 to an end surface 13b on the other side in the axial direction AD of the stator core 11, and an opening portion 12a is open on the inner circumferential surface of the stator core 11.

The coil 15 is inserted into each of the plurality of slots 12 formed in the stator core 11, and additionally includes a plurality of coil segments protruding outwardly in the axial direction AD of the stator core 11 from each of the slot 12.

These plurality of coil segments are configured with a plurality of first coil segments 20 and a plurality of second coil segments 30.

Figure 2:
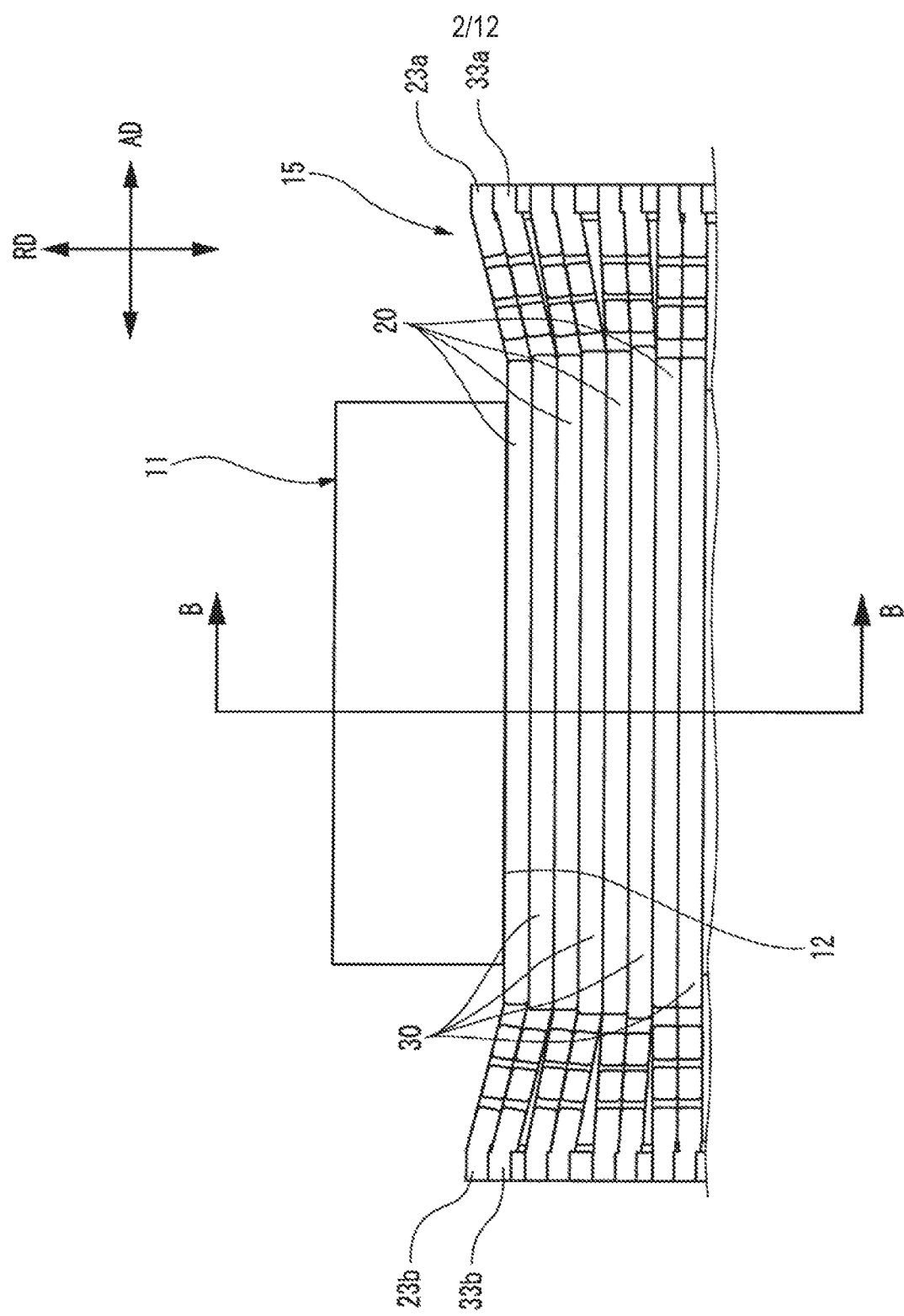
FIG. 2 is a cross sectional view taken along line A-A of FIG. 1.
Figure 3:
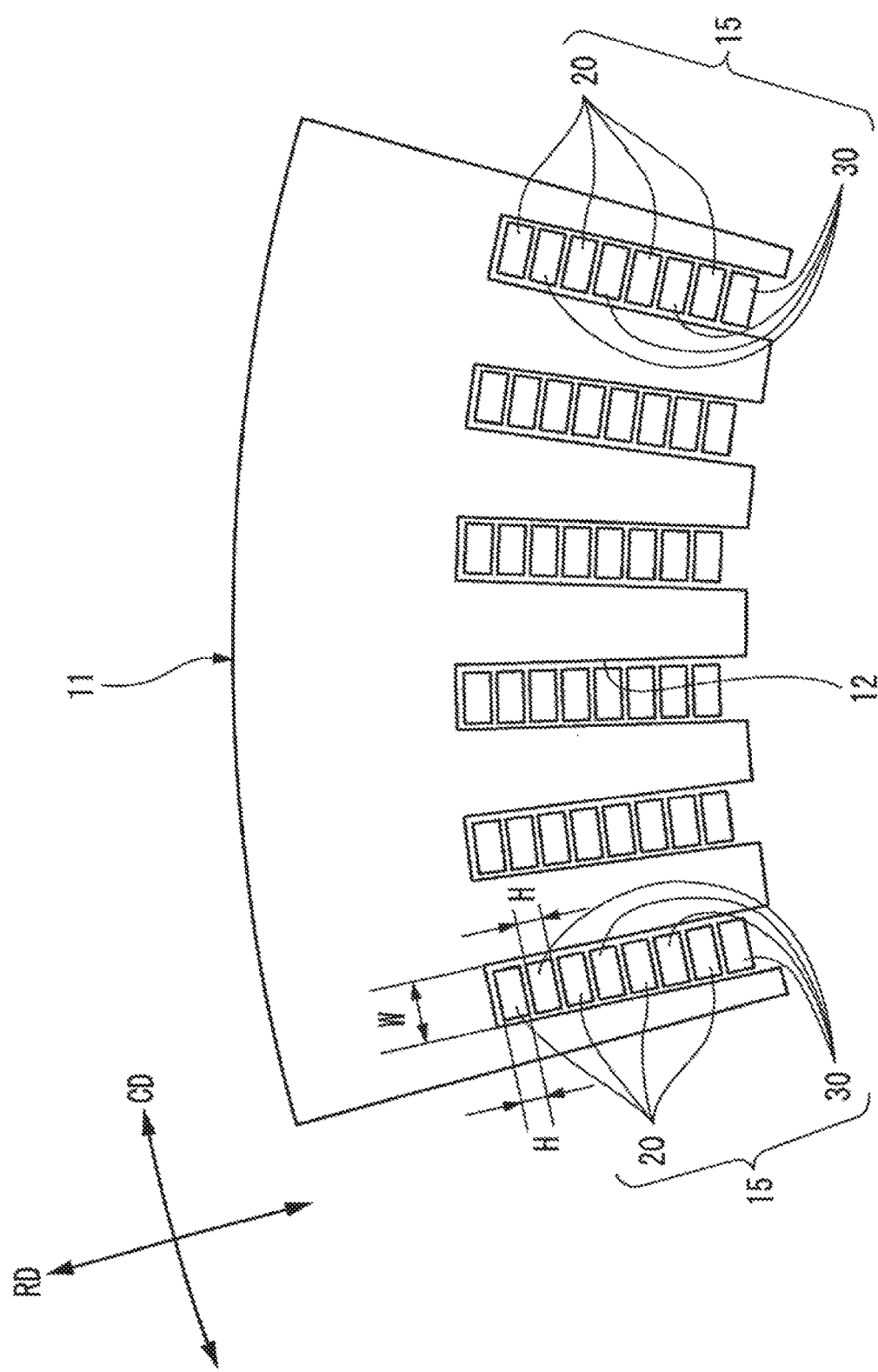
FIG. 3 is a cross sectional view taken along line B-B of FIG. 2.

As illustrated in FIGS. 2 and 3, the four first coil segments 20 and the four second coil segments 30 alternate from an outer diameter side of the slot 12 of the stator core 11, and namely total eight coil segments are inserted. That is, four sets of coil segments, each of which is made up with the first coil segment 20 and the second coil segment 30 neighboring each other, are inserted in each of the slots 12 of the stator core 11.

Figure 4A:
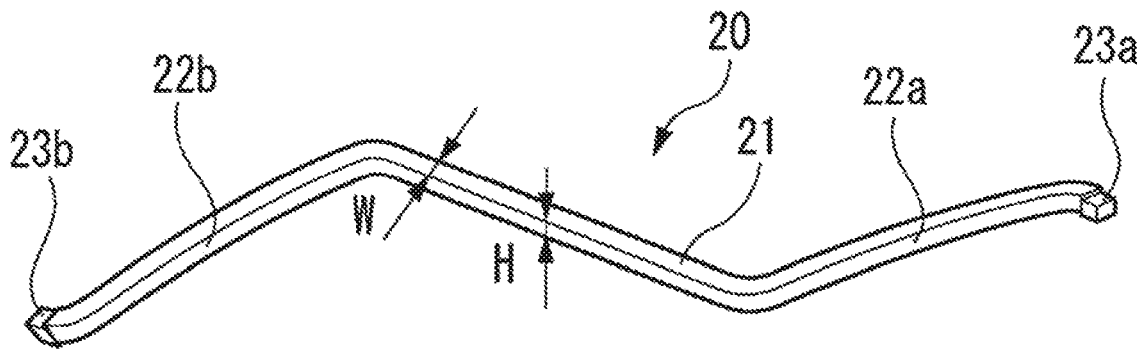
FIG. 4A is a perspective view of a first coil segment in the stator illustrated in FIG. 1.
Figure 8:
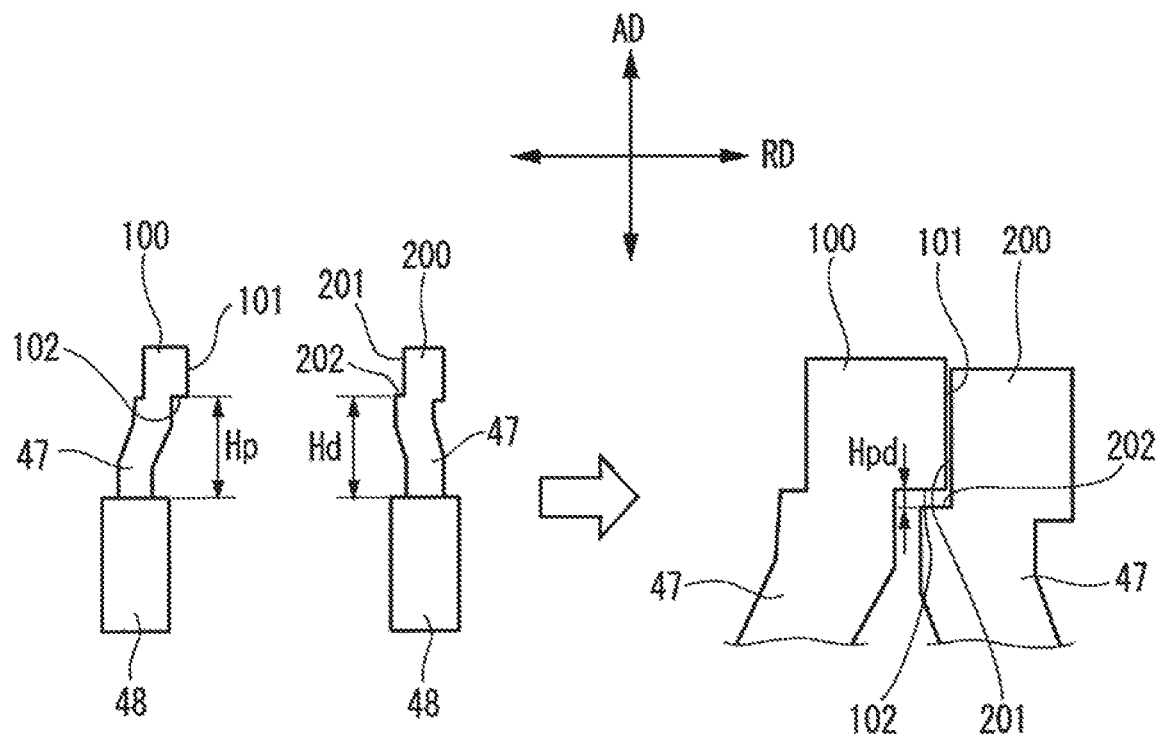
FIG. 8 is an explanatory view illustrating a first assembly condition under which end portions of the first coil segment and the second coil segment can be assembled.

As illustrated in FIGS. 3 and 4A, the first coil segment 20 is, for example, a member of a general crank shape whose cross section is of a generally rectangular shape, and which is formed by subjecting copper wire to wire processing. In a cross section of the first coil segment 20, a width W of the circumferential direction is longer than a width H of the radial direction. The first coil segment 20, which is so-called magnet wire, is configured with a conductive body 47 and an insulating cover film 48 covering the conductive body 47 as illustrated in FIG. 8.

The first coil segment 20 includes a insertion portion 21 of a straight line shape inserted in the slot 12, a first protruding portion 22a which protrudes from one end of the insertion portion 12 outwardly in the axial direction AD of the stator core 11 more than the end surface 13a of the stator core 11, and a second protruding portion 22b which protrudes from the other end of the insertion portion 22 outwardly in the axial direction AD more than the end surface 13b of the stator core 11.

An end portion 23a of the first protruding portion 22a is bent to a direction intersecting a direction in which the first protruding portion 22a extends, so as to become substantially parallel to the insertion portion 21. The end portion 23a of the first protruding portion 22a is of a step shape formed to offset outwardly in the radial direction of the stator core 11 by a press forming process (see FIGS. 6 and 7).

An end portion 23b of the second protruding portion 22b is bent to a direction intersecting a direction in which the second protruding portion 22b extends, so as to become substantially parallel to the insertion portion 21. Similarly to the end portion 23a of the first protruding portion 22a, the end portion 23b of the second protruding portion 22b is of a step shape formed to offset outwardly in the radial direction of the stator core 11 by a press forming process (see FIGS. 6 and 7).

Figure 4B:
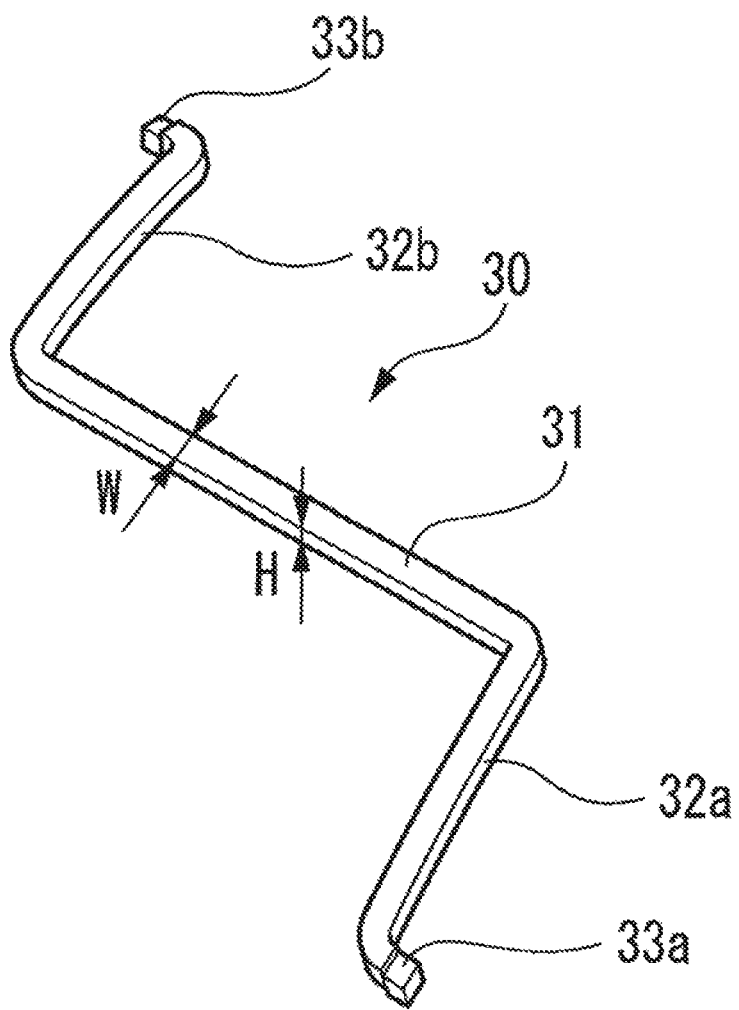
FIG. 4B is a perspective view of a second coil segment in the stator illustrated in FIG. 1.

As illustrated in FIGS. 3 and 4B, the second coil segment 30 is, for example, a member of a general crank shape whose cross section is of a generally rectangular shape, and which is formed by subjecting copper wire to wire processing. In a cross section of the second coil segment 30, a width W of the circumferential direction is longer than a width H of the radial direction. The second coil segment 30, which is so-called magnet wire, is configured with a conductive body 47 and an insulating cover film 48 covering the conductive body 47 as illustrated in FIG. 8.

The second coil segment 30 includes a insertion portion 31 inserted in the slot 12, a first protruding portion 32a which protrudes outwardly in the axial direction AD of the stator core 11 more than the end surface 13a of the stator core 11, and a second protruding portion 32b which protrudes outwardly in the axial direction AD more than the end surface 13b of the stator core 11.

An end portion 33a of the first protruding portion 32a is bent to a direction intersecting a direction in which the first protruding portion 32a extends, so as to become substantially parallel to the insertion portion 31. The end portion 33a of the first protruding portion 32a is of a step shape formed to offset outwardly in the radial direction of the stator core 11 by a press forming process (see FIGS. 6 and 7).

An end portion 33b of the second protruding portion 32b is bent to a direction intersecting a direction in which the second protruding portion 32b extends, so as to become substantially parallel to the insertion portion 31. Similarly to the end portion 33a of the first protruding portion 32a, the end portion 33b of the second protruding portion 32b is of a step shape formed to offset outwardly in the radial direction of the stator core 11 by a press forming process (see FIGS. 6 and 7).

Figure 5:
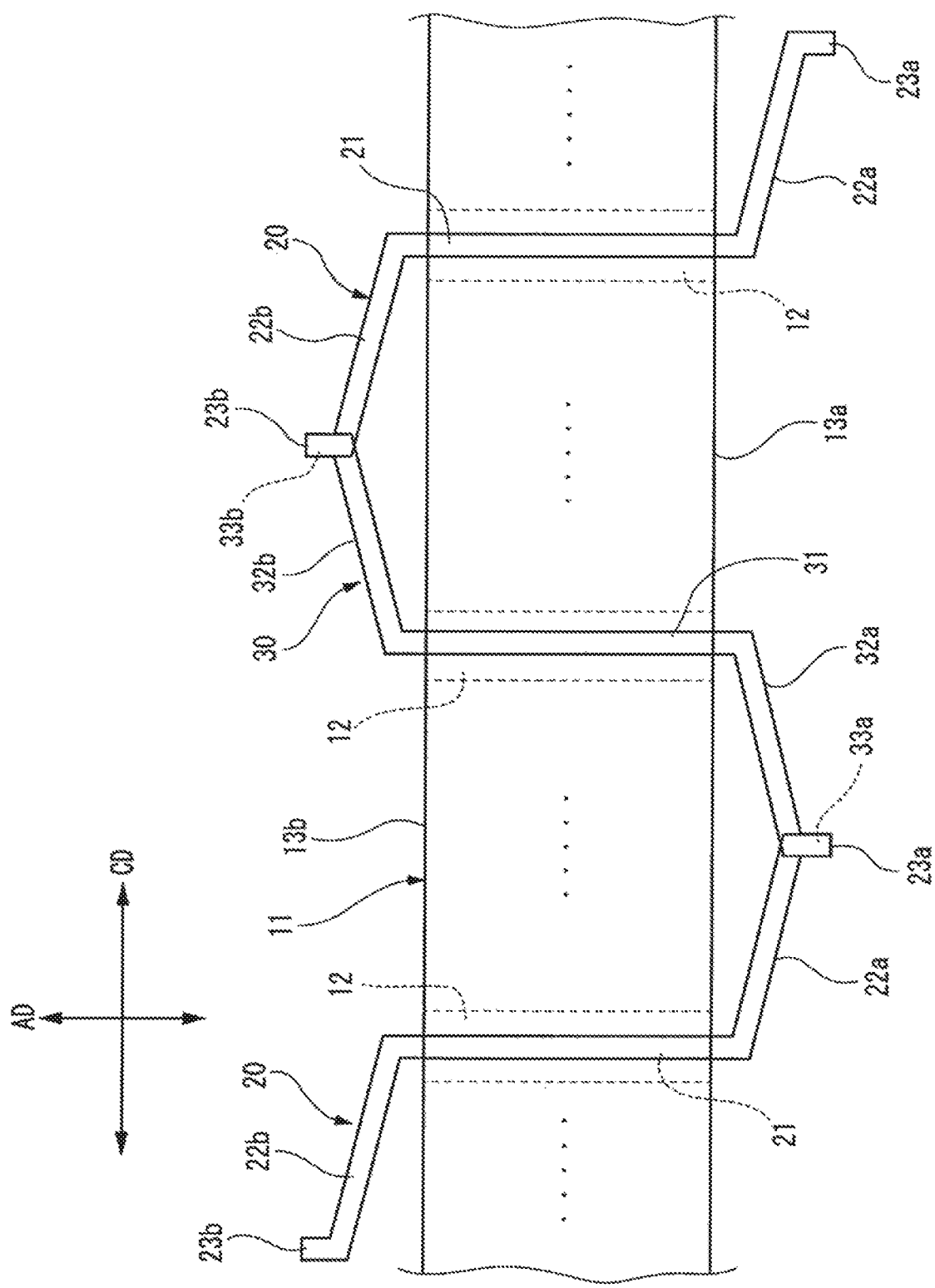
FIG. 5 is a development view of a portion of the stator of FIG. 1 when viewed outwardly in the radial direction of a stator core.

As illustrated in FIG. 5, the first protruding portion 22a of the first coil segment 20 whose insertion portion 21 is inserted in the slot 12 extends toward the right direction along the circumferential direction CD of the stator core 11. The second protruding portion 22b extends toward a direction (left direction) opposite to that of the first protruding portion 22a along the circumferential direction CD of the stator core 11.

Similarly, the first protruding portion 32a of the second coil segment 30 whose insertion portion 31 is inserted in the slot 12 extends toward the left direction along the circumferential direction CD of the stator core 11. The second protruding portion 32b extends toward a direction (right direction) opposite to that of the first protruding portion 32a along the circumferential direction CD of the stator core 11.

Further, in FIG. 5, in order to facilitate the understanding, only one second coil segment 30 and two first coil segments 20 electrically connected to the second coil segment 30 are extracted to be illustrated with regard to the coil 15.

The end portion 23a of the first coil segment 20 is bonded with the end portion 33a of the second coil segment 30 inserted in the different slot 12 which is in a position (a position moved clockwise when viewed from the end surface 13a) separated in one direction of the circumferential direction CD of the stator core 11 with respect to the slot 12 (hereinafter, also referred to as "insertion slot") in which this first coil segment 20 is inserted. Further, the bonding refers to the conductive bodies being connected electrically.

Likewise, the end portion 23b of the first coil segment 20 is bonded with the end portion 33b of the second coil segment 30 inserted in another different slot 12 which is in a position (a position moved counterclockwise when viewed from the end surface 13a) separated in the other direction of the circumferential direction CD of the stator core 11 with respect to the insertion slot.

As described above, the bonding of the end portion 23a of the first coil segment 20 with the end portion 33a of the second coil segment 30, and the bonding of the end portion 23b of the first coil segment 20 with the end portion 33b of the second coil segment 30 are repeated to form a coil loop.

The coil 15 includes a plurality of coil loops, and constitutes electric power line of a plurality of phases (for example, U phase, V phase, and W phase) by selectively connecting the plurality of coil loops.

Figure 6:
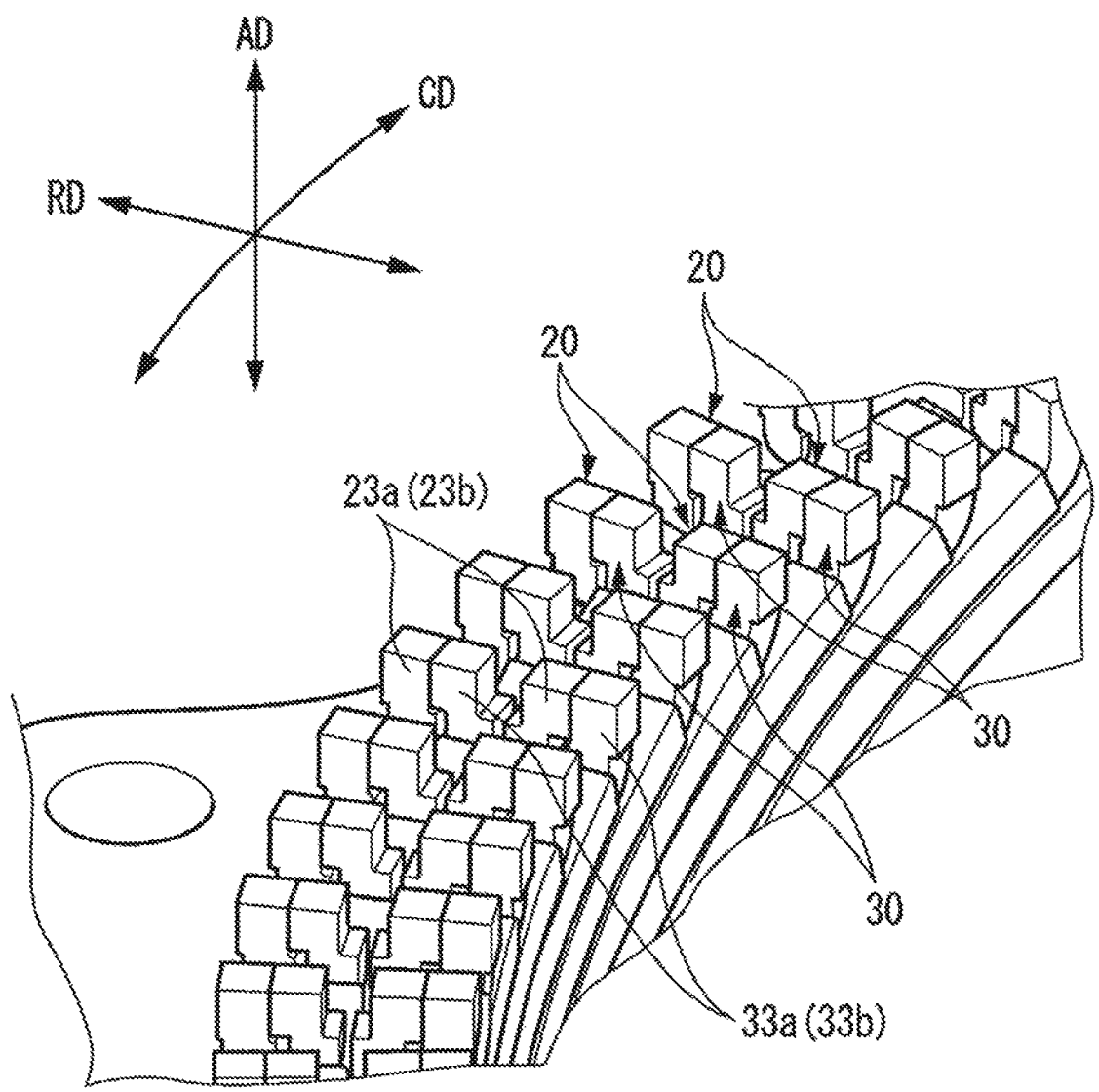
FIG. 6 is a partial perspective view of the stator illustrating a state where end portions of the first coil segment and the second coil segment are bonded to each other.
Figure 7:
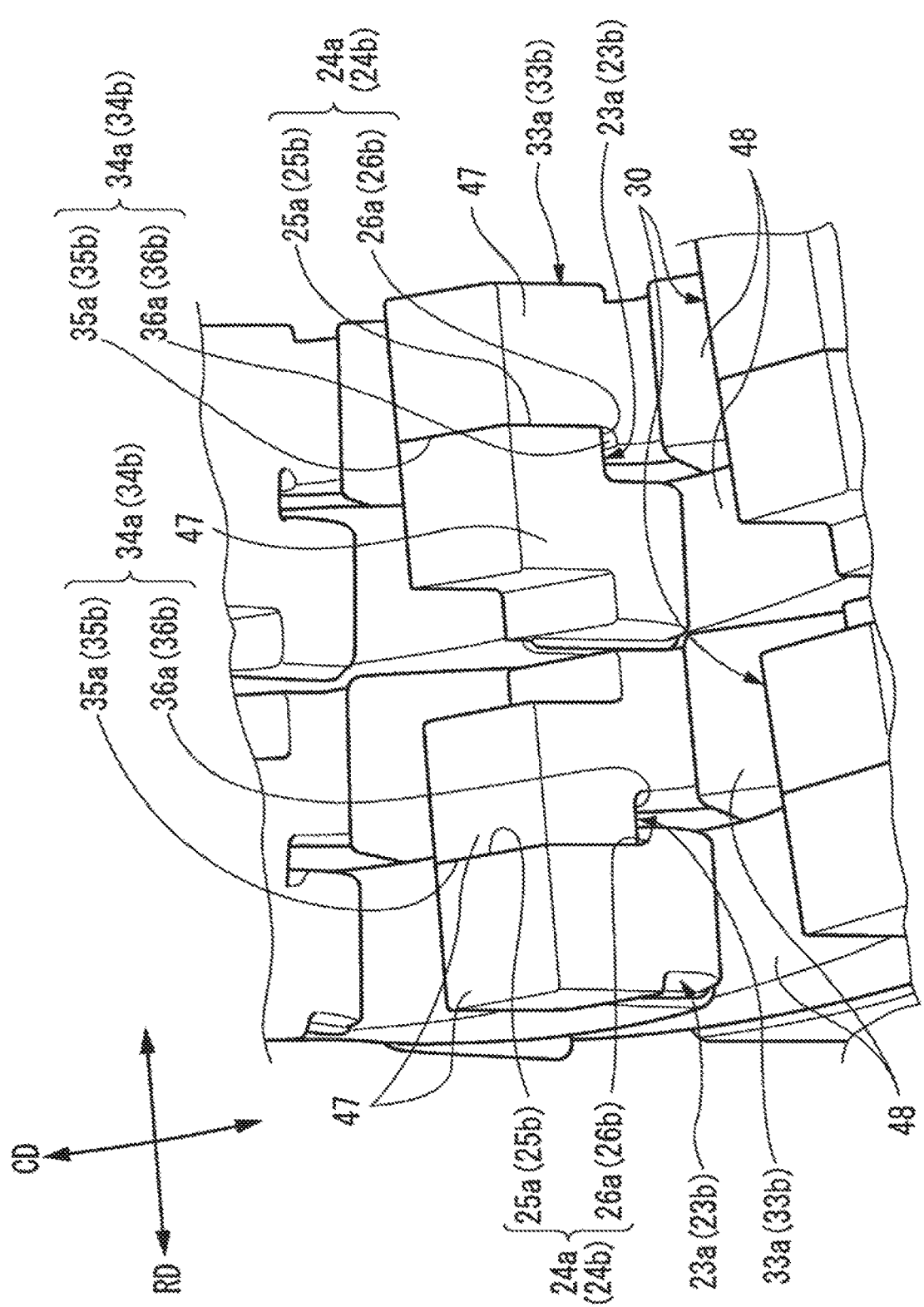
FIG. 7 is a partial enlarged view of a part of FIG. 6.

As illustrated in FIGS. 6 and 7, the end portion 23a of the first coil segment 20 and the end portion 33a of the second coil segment 30 are bonded by means of laser welding in a state of abutting each other.

Further, since the configuration of the two sets of coil segments inserted in the inner diameter side of each of the slots 12 of the stator core 11 is similar to the configuration of the two sets of coil segments inserted in the outer diameter side, in the following description, two sets of coil segments inserted in the outer diameter side of each of the slots 12 will be described, and however the description of two sets of coil segments of the inner diameter side will be omitted.

Specifically, the end portion 23a of the first coil segment 20 and the end portion 33a of the second coil segment 30 are welded by means of laser welding in a state where an abutting portion 24a provided at the end portion 23a of the first coil segment 20 and an abutting portion 34a provided at the end portion 33a of the second coil segment 30 abut against each other while at the same time the abutting portions 24a and 34a are superimposed in the radial direction RD of the stator core 11.

Similarly, the end portion 23b of the first coil segment 20 and the end portion 33b of the second coil segment 30 are welded by means of laser welding in a state where abutting portions 24b and 34b abut against each other.

As illustrated in FIGS. 6 and 7, the abutting portion 24a (24b) of the first coil segment 20 is configured with a bonding surface 25a (25b) facing the inner side of the radial direction and an engaging surface 26a (26b) intersecting with (for example, perpendicular to) the bonding surface 25a (25b) while the conductive body 47 is exposed from the insulating cover film 48. The abutting portion 24a (24b) of the first coil segment 20 of the outermost diameter side is a concave portion which is recessed toward the outer diameter side of the stator core 11, and is formed in a surface facing the abutting portion 34a (34b) provided at the end portion 33a (33b) of the second coil segment 30 of the outermost diameter side. On the other hand, the abutting portion 24a (24b) of the first coil segment 20 which is second one from the outermost diameter side is a convex portion which projects toward the inner diameter side of the stator core 11, and is formed in a surface facing the abutting portion 34a (34b) provided at the end portion 33a (33b) of the second coil segment 30 which is second one from the outer diameter side.

The bonding surface 25a (25b) extends in the circumferential direction CD and the axial direction AD, and is a surface which is bonded by means of laser welding to the bonding surface 35a (35b) of the second coil segment 30 to be described later.

The engaging surface 26a (26b) is a surface which intersects with the bonding surface 25a (25b) and extends in the circumferential direction CD and the radial direction RD of the stator core 11, and engages the engaging surface 36a (36b) of the second coil segment 30 to be described later.

Additionally, the abutting portion 34a (34b) of the second coil segment 30 is configured with a bonding surface 35a (35*b*) facing the outer side of the radial direction and an engaging surface 36*a* (36*b*) intersecting with (for example, perpendicular to) the bonding surface 35*a* (35*b*) while the conductive body 47 is exposed from the insulating cover film 48. The abutting portion 34*a* (34*b*) of the second coil segment 30 of the outermost diameter side is a convex portion which projects toward the outer diameter side of the stator core 11, and is formed in a surface facing the abutting portion 24*a* (24*b*) provided at the end portion 23*a* (23*b*) of the first coil segment 20 of the outermost diameter side. On the other hand, the abutting portion 34*a* (34*b*) of the second coil segment 30 which is second one from the outermost diameter side is a concave portion which is recessed toward the inner diameter side of the stator core 11, and is formed in a surface facing the abutting portion 24*a* (24*b*) provided at the end portion 23*a* (23*b*) of the first coil segment 20 which is second one from the outer diameter side.

The bonding surface 35*a* (35*b*) extends in the circumferential direction CD and the axial direction AD, and is a surface which is bonded by means of laser welding to the bonding surface 25*a* (25*b*) of the first coil segment 20.

The engaging surface 36*a* (36*b*) is a surface which intersects with the bonding surface 35*a* (35*b*) and extends in the circumferential direction CD and the radial direction RD of the stator core 11, and engages the engaging surface 26*a* (26*b*) of the first coil segment 20.

Herein, the abutting portions 24*a* (24*b*) and 34*a* (34*b*) of the first coil segment 20 and the second coil segment 30 are formed by press forming the end portions 23*a* (23*b*) and 33*a* (33*b*) of the first coil segment 20 and the second coil segment 30 as described above, but dimensional accuracy in the press forming has a relatively great variation.

When the abutting portion 24*a* (24*b*) of the first coil segment 20 and the abutting portion 34*a* (34*b*) of the second coil segment 30 abut against each other, in order to prevent the interference between the engaging surface 26*a* (26*b*) and the engaging surface 36*a* (36*b*), it is necessary to set a height Hp from the insulating cover film 48 of the abutting portion of the convex side (hereinafter, referred to as a convex side abutting portion 100) to the bonding surface of the convex side (hereinafter, referred to as a convex side bonding surface 101) greater than a height Hd from the insulating cover film 48 of the abutting portion of the concave side (hereinafter, referred to as a concave side abutting portion 200) to the bonding surface of the concave side (hereinafter, referred to as a concave side bonding surface 201) as illustrated in FIG. 8.

Therefore, as illustrated in FIG. 8, when the convex side bonding surface 101 and the concave side bonding surface 201 abut against each other, a necessary clearance Hpd is formed between the engaging surface of the convex side (hereinafter, referred to as a convex side engaging surface 102) and the engaging surface of the concave side (hereinafter, referred to as a concave side engaging surface 202).

Additionally, when the abutting portion 24*a* (24*b*) of the first coil segment 20 and the abutting portion 34*a* (34*b*) of the second coil segment 30 abut against each other, it is necessary to bring the convex side bonding surface 101 and the concave side bonding surface 201 into contact to each other.

Figure 9:
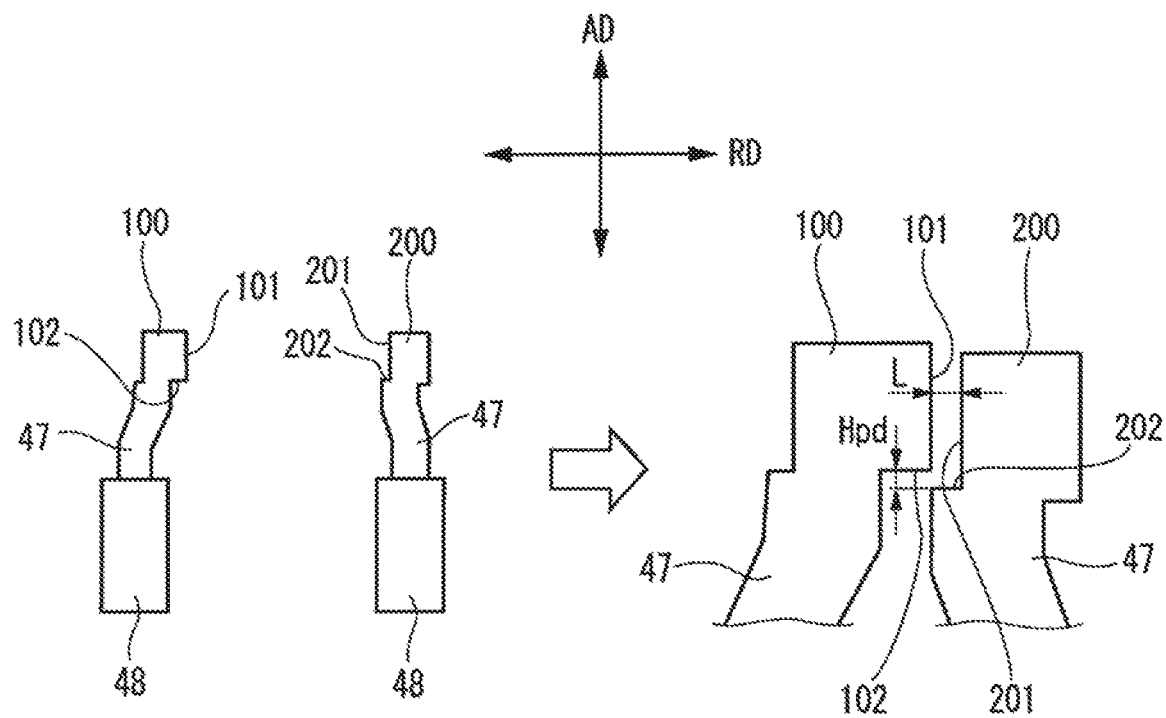
FIG. 9 is an explanatory view illustrating a second assembly condition under which end portions of the first coil segment and the second coil segment can be assembled.
Figure 10:
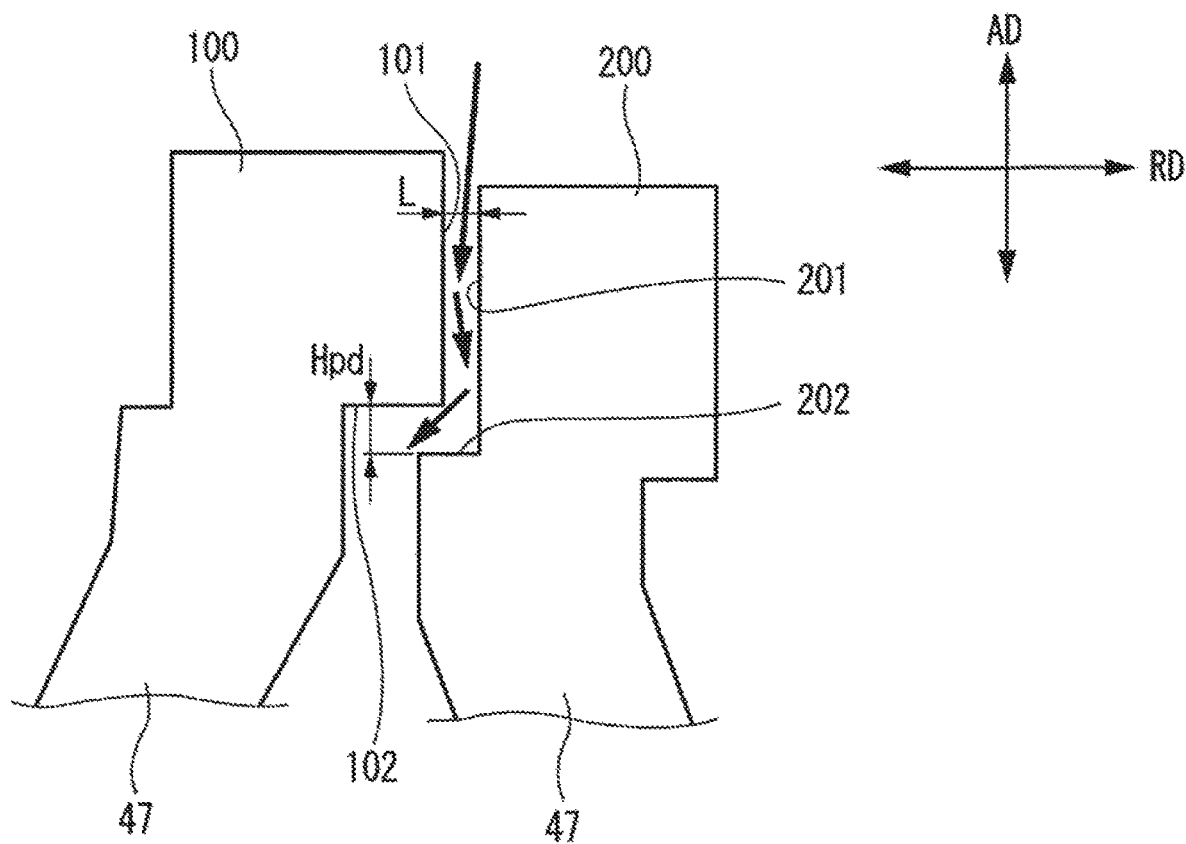
FIG. 10 is an explanatory view illustrating paths of laser light in a case where a clearance is formed between bonding surfaces of the first coil segment and the second coil segment.

In a state where the clearance Hpd is formed between the convex side engaging surface 102 and the concave side engaging surface 202, as illustrated in FIG. 9, if a clearance L is also formed between the convex side bonding surface 101 and the concave side bonding surface 201, as illustrated in FIG. 10, laser beam is irregularly reflected between the bonding surfaces 101 and 201, and thus there is a worry that the insulating cover film at a non-intended portion may be damaged. In particular, copper generally used as the conductive body has a high reflection rate for laser light, and thus it is necessary to remove the clearance L between the bonding surfaces 101 and 201.

Figure 11:
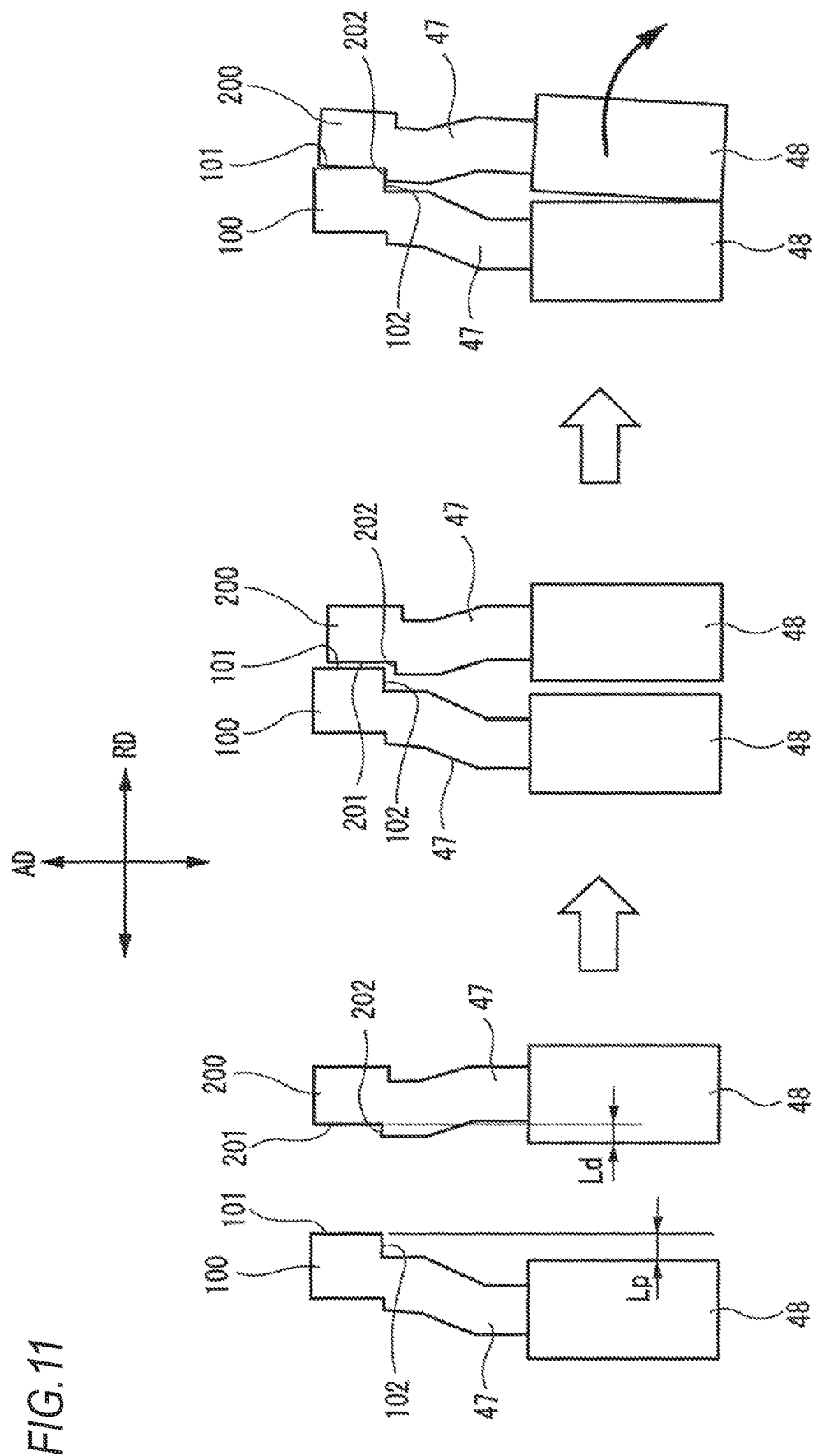
FIG. 11 is an explanatory view illustrating a third assembly condition under which end portions of the first coil segment and the second coil segment can be assembled.

Herein, when the abutting portion 24*a* (24*b*) of the first coil segment 20 and the end portion 34*a* (34*b*) of the second coil segment 30 abut against each other, in order to bring the convex side bonding surface 101 and the concave bonding surface 201 into contact to each other, as illustrated in FIG. 11, a protruding distance Lp from the insulating cover film 48 in the convex side abutting portion 100 to the convex side bonding surface 101 in the radial direction is set to be greater than a retraction distance Ld from the insulating cover film 48 in the concave side abutting portion 200 to the concave side bonding surface 201 (that is, Lp>Ld). Further, this protruding distance Lp is a minimum value within a tolerance range on which a dimensional error is reflected, and the retraction distance Ld is a maximum value within a tolerance range on which a dimensional error is reflected.

In the convex side abutting portion 100 and the concave side abutting portion 200 which are set as described above, the convex side bonding surface 101 and the concave side bonding surface 201 are, for example, as illustrated in FIG. 11, brought into contact with each other basically without a clearance by bringing the convex side abutting portion 100 close to the concave side abutting portion 200. As the protruding distance Lp is a minimum value within the tolerance range on which the dimensional error is reflected, and the retraction distance Ld is a maximum value within the tolerance range on which the dimensional error is reflected, it is possible to bring the bonding surfaces 101 and 201 into contact with each other even when the dimensional error is great.

However, because of flexibility of the coil segment (spring back), it can be imagined that some of the convex side bonding surfaces 101 and some of the concave side bonding surfaces 201 are not brought into contact with each other.

However, even in this case, by pressing the convex side abutting portion 100 and the concave side abutting portion 200 so as to become close to each other, the insulating cover film 48 of the convex side abutting portion 100 is brought into contact with the insulting cover film 48 of the concave side abutting portion 200. Therefore, as illustrated by an arrow in FIG. 11, when the concave side abutting portion 200 is rotated about this contact point, a corner of the concave side engaging surface 202 engages the convex side engaging surface 102, and at the same time, a corner of the convex side bonding surface 101 is brought into contact with the concave side bonding surface 201. With this configuration, it is possible to prevent laser light from passing through between the bonding surfaces 101 and 201.

Figure 12:
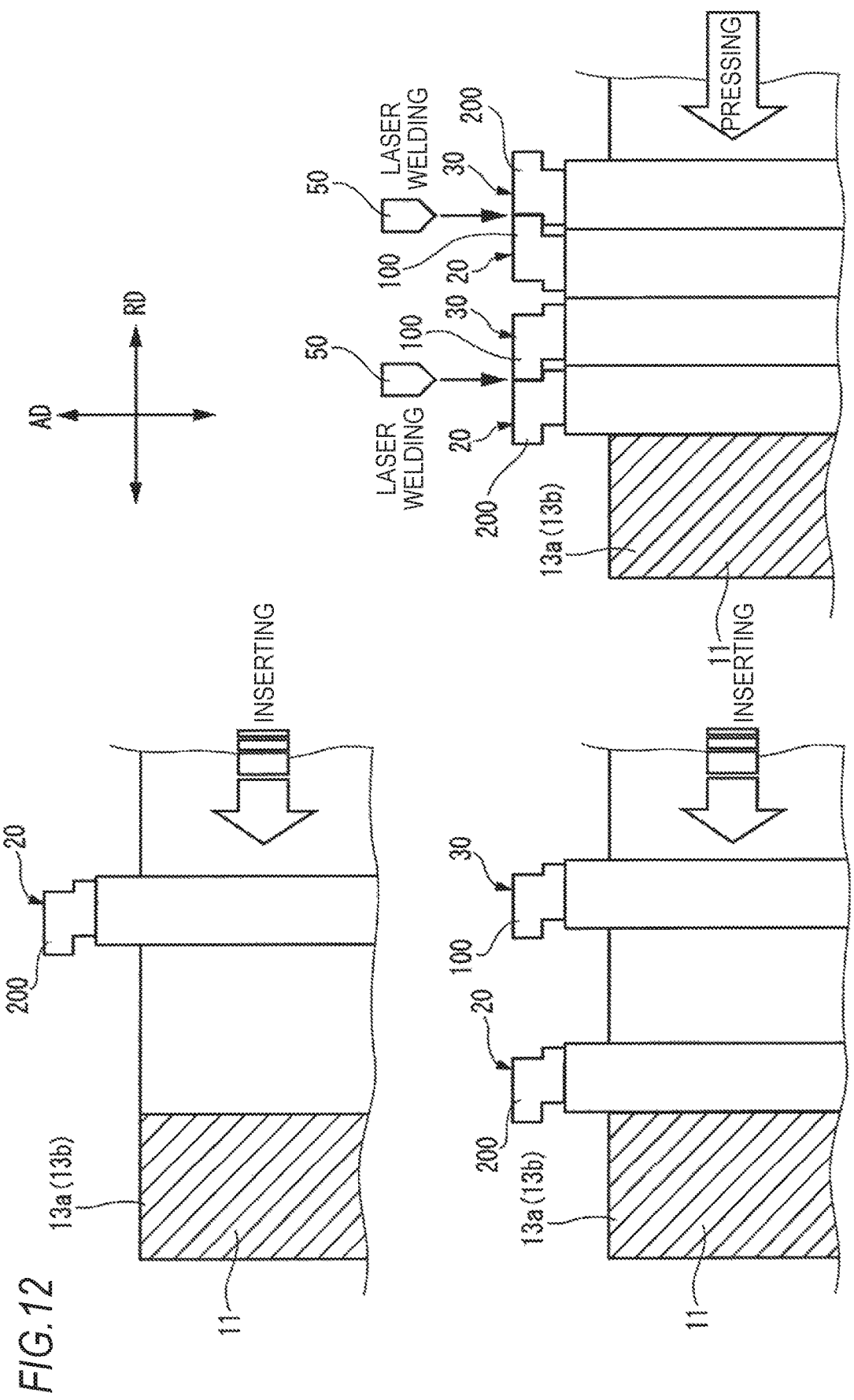
FIG. 12 is an explanatory view illustrating the assembly and bonding of two sets of coil segments of the outer diameter side.

FIG. 12 is an explanatory diagram illustrating the assembly and bonding of the two sets of coil segments of the outer diameter side.

First, the first coil segment 20 and the second coil segment 30 are alternatively inserted from the opening portion 12*a* of each of the slots 12. Then, two sets of coil segments 20 and 30 are pressed from the inner side of the radial direction toward the outer side of the radial direction by a jig (not illustrated), and thereby the engaging surfaces 102 and 202 are brought into contact with each other while at the same time the bonding surfaces 101 and 201 are brought into contact with each other, regardless of the dimensional error and the flexibility (spring back) of the coil segment.

Successively, in a state where the two sets of the coil segments 20 and 30 are pressed in the radial direction, the convex side abutting portion 100 and the concave side abutting portion 200 are welded by irradiating laser light toward the end surface 13a of the stator core 11 along the boundary surfaces of the bonding surfaces 101 and 201 by means of a laser irradiating apparatus 50 which is disposed opposite to the end surface 13a (13b) of the stator core 11 with the convex abutting portion 100 and the concave side abutting portion 200 interposed therebewteen. Further, FIG. 12 illustrates only two sets of coil segments of the outer diameter side, and however after welding the two sets of coil segments of the outer diameter side, two sets of coil segments of the inner diameter side may be inserted and welded, or the four sets of coil segments may be inserted at once and welded.

Figure 13:
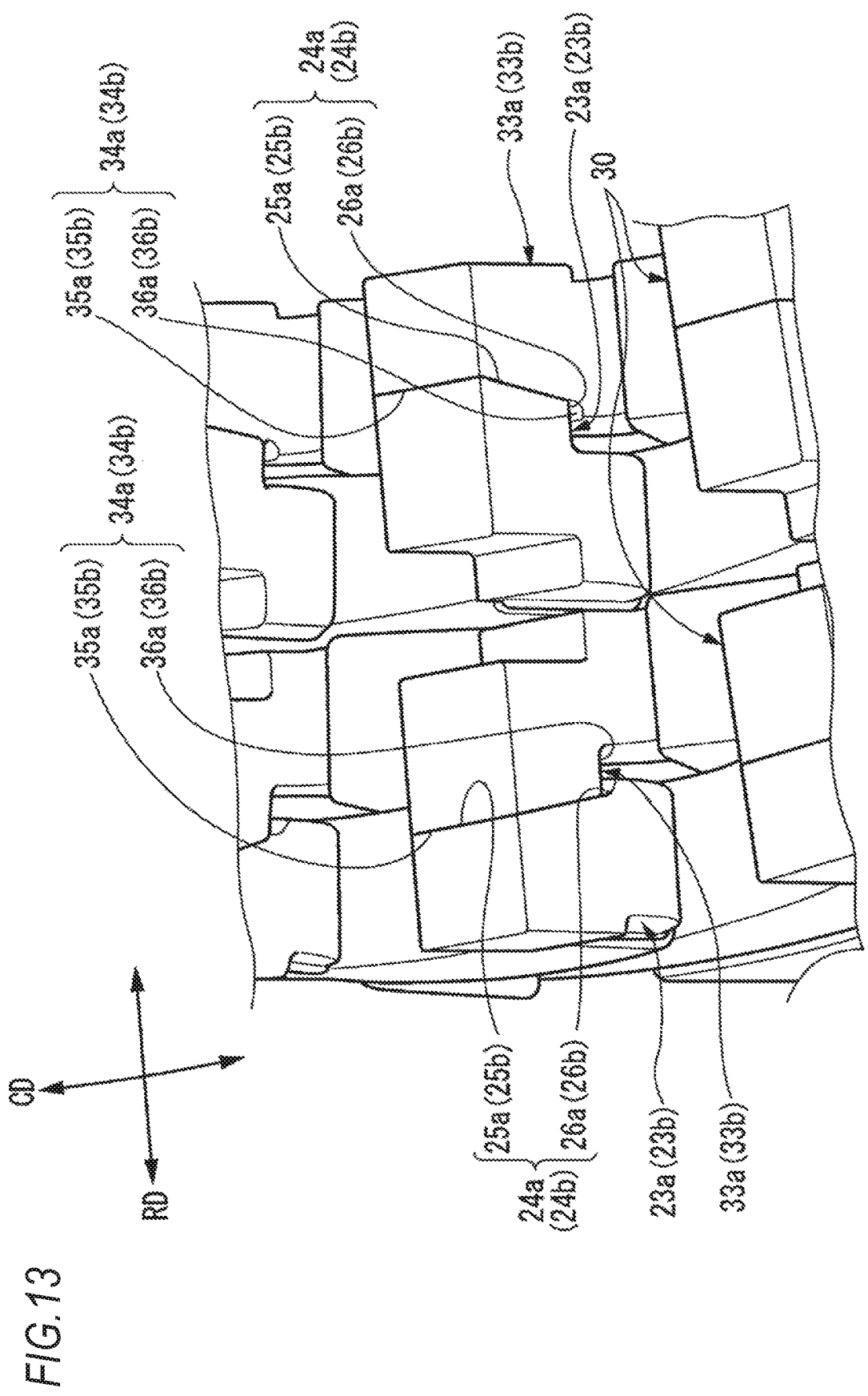
FIG. 13 is a partial perspective view of the stator illustrating a state where end portions of the first coil segment and the second coil segment of a modification are bonded to each other.

Additionally, when the coil segments 20 and 30 are bonded in as state where they are pressed in the radial direction, there may be a case where distance for insulation is not secured between neighboring sets of the coil segments. Herein, as illustrated in FIG. 13, the bonding surfaces 101 and 201 may be inclined. For example, in FIG. 13, the bonding surfaces 101 and 201 of the first coil segment 20 and the second coil segment 30 of the outermost diameter side form a slope which is inclined outwardly in the radial direction as it goes outwardly in the axial direction. Similarly, in the first coil segment 20 and the second coil segment 30 which are second ones from the outermost diameter side, the bonding surfaces 101 and 201 form a slope which is inclined inwardly in the radial direction as it goes outwardly in the axial direction.

With this configuration, in a state where the coil segments 20 and 30 are pressed in the radial direction, a part of displacement in the radial direction is converted into a displacement in the outward direction in the axial direction, and thus the distance for insulation can be secured from the neighboring set of coil segments 20 and 30.

Further, the embodiments described above can be adjusted, changed, improved and the like.

Additionally, in the disclosure, at least the followings are described: Further, constituting elements corresponding to the embodiments described above are illustrated in the parentheses, but the invention is not limited to them.

(1) A stator of an electric rotary machine comprising:
a stator core (stator core 11); and
a coil (coil 15) which is inserted into each of a plurality of slots (slots 12) formed in the stator core, and includes a plurality of coil segments protruding outwardly in an axial direction (axial direction AD) of the stator core from the slot, wherein
each of the plurality of coil segments includes a plurality of first coil segments (first coil segments 20) and a plurality of second coil segments (second coil segments 30),
the first coil segment includes an insertion portion (insertion portion 21) inserted in the slot, and a protruding portion (protruding portion 22a) which protrudes outwardly in the axial direction more than an end surface (end surface 13a) of the axial direction of the stator core,
the second coil segment includes an insertion portion (insertion portion 31) inserted in the slot, and a protruding portion (protruding portion 32a) which protrudes outwardly in the axial direction more than an end surface (end surface 13a) of the axial direction of the stator core,
an end portion of the protruding portion of the first coil segment includes a first abutting portion (abutting portion 24a) in which a conductive body (conductive body 47) is exposed from an insulating cover film (insulating cover film 48),
an end portion of the protruding portion of the second coil segment includes a second abutting portion (abutting portion 34a) in which a conductive body (conductive body 47) is exposed from an insulating cover film (insulating cover film 48),
the first abutting portion and the second abutting portion are welded by laser welding in a state where the abutting portions abut against each other,
the first abutting portion and the second abutting portion include bonding surfaces (bonding surfaces 25a and 35a) which are bonded to each other, and engaging surfaces (engaging surfaces 26a and 36a) which intersect with the bonding surfaces and engage each other,
one abutting portion (concave side abutting portion 200) of the first abutting portion and the second abutting portion is a concave portion formed in a surface opposite to another abutting portion (convex side abutting portion 100),
the other abutting portion is a convex portion formed in a surface opposite to the one abutting portion,
in the axial direction, a height (height Hp) from the insulating cover film to the bonding surface in the other abutting portion is greater than a height (height Hd) from the insulating cover film to the bonding surface in the one abutting portion, and in the radial direction, a protruding distance (protruding distance Lp) from the insulating cover film to the bonding surface in the other abutting portion is greater than a retraction distance (retraction distance Ld) from the insulating cover film to the bonding surface in the one abutting portion (concave side abutting portion 200).

According to (1), in the axial direction, as the height from the insulating cover film in the convex portion side abutting portion to the bonding surface is greater than the height from the insulating cover film in the concave portion side abutting portion to the bonding surface, even when there are dimensional error or assembly error, interference between the bonding surface of the convex portion side abutting portion and the engaging surface of the concave portion side abutting portion is prevented. Further, in the radial direction, as the protruding distance from the insulating cover film to the bonding surface in the convex portion side abutting portion is greater than the retraction distance from the insulating cover film to the bonding surface in the concave portion side abutting portion, the bonding surfaces certainly abut against each other even when the insulating cover films of the convex portion side abutting portion and the concave portion side abutting portion abut against each other. Therefore, it is possible to bond the first abutting portion and the second abutting portion by means of laser welding in a state of surely abutting against each other.

Further, as the first abutting portion of the first coil segment and the second abutting portion of the second coil segment include bonding surfaces which are bonded to each other, and engaging surfaces which intersect with the bonding surfaces and engage each other, it is possible to bond the first coil segment and the second coil segment in a state where their positions are determined. Further, as the engaging surface of any one of the first coil segment and the second coil segment also serves as a leakage preventing portion of laser light when the bonding surfaces are subjected to laser welding, it is possible to avoid negative effects of the laser light to other region.

(2) The stator of the electric rotary machine of (1), wherein the first coil segment and the second coil segment are bonded to each other in a state where the first abutting portion and the second abutting portion are pressed in a radial direction.

According to (2), as the first coil segment and the second coil segment are bonded to each other in a state where the first abutting portion and the second abutting portion are pressed in a radial direction, it is possible to surely make the engaging surfaces engage each other while bringing the bonding surfaces into contact with each other even when there is variation in deformation by the flexibility (spring back) of the coil.

(3) The stator of the electric rotary machine of (1) or (2), wherein the bonding surface of the first abutting portion and the bonding surface of the second abutting portion are slopes inclined in the radial direction as it goes outwardly in an axial direction.

According to (3), by bringing the slopes of the first abutting portion and the second abutting portion into contact with each other, a part of displacement in the radial direction is converted into a displacement in the axial direction. Therefore, it is possible to secure a distance for insulation from another bonding portion neighboring in the radial direction.

The invention claimed is:

1. A stator of an electric rotary machine comprising:
a stator core; and
a coil which is inserted into each of a plurality of slots formed in the stator core, and includes a plurality of coil segments protruding outwardly in an axial direction of the stator core from the slot, wherein:
each of the plurality of coil segments includes a plurality of first coil segments and a plurality of second coil segments;
a first coil segment of the plurality of first coil segments includes an insertion portion inserted in the slot, and a protruding portion which protrudes outwardly in the axial direction more than an end surface of the axial direction of the stator core;
a second coil segment of the plurality of second coil segments includes an insertion portion inserted in the slot, and a protruding portion which protrudes outwardly in the axial direction more than the end surface;
an end portion of the protruding portion of the first coil segment includes a first abutting portion in which a conductive body is exposed from an insulating cover film;
an end portion of the protruding portion of the second coil segment includes a second abutting portion in which a conductive body is exposed from an insulating cover film;
the first abutting portion and the second abutting portion are welded by laser welding in a state where the abutting portions abut against each other;
the first abutting portion and the second abutting portion include bonding surfaces which are bonded to each other, and engaging surfaces which intersect with the bonding surfaces and engage each other;
one abutting portion of the first abutting portion and the second abutting portion is a concave portion formed in a surface opposite to another abutting portion;
the other abutting portion is a convex portion formed in a surface opposite to the one abutting portion;
in the axial direction, a height from the insulating cover film to the bonding surface in the other abutting portion is greater than a height from the insulating cover film to the bonding surface in the one abutting portion; and
in a radial direction, a protruding distance from the insulating cover film to the bonding surface in the other abutting portion is greater than a retraction distance from the insulating cover film to the bonding surface in the one abutting portion.

2. The stator of the electric rotary machine of claim 1, wherein
the first coil segment and the second coil segment are bonded to each other in a state where the first abutting portion and the second abutting portion are pressed in a radial direction.

3. The stator of the electric rotary machine of claim 1, wherein
the bonding surface of the first abutting portion and the bonding surface of the second abutting portion are slopes inclined in the radial direction as it goes outwardly in an axial direction.

4. The stator of the electric rotary machine of claim 1, wherein
the engaging surfaces respectively intersect perpendicularly with the bonding surfaces.

5. The stator of the electric rotary machine of claim 1, wherein
in the axial direction, a height from the insulating cover film to all portions of the engaging surface in the other abutting portion is greater than a height from the insulating cover film to all portions of the engaging surface in the one abutting portion.

6. The stator of the electric rotary machine of claim 1, wherein
the engaging surfaces are engaged so that respective planar surfaces thereof are in contact with each other.

* * * * *

UNITED STATES PATENT AND TRADEMARK OFFICE
CERTIFICATE OF CORRECTION

Page 1 of 1

PATENT NO. : 10,862,367 B2
APPLICATION NO. : 16/295163
DATED : December 8, 2020
INVENTOR(S) : Koji Kawanami et al.

It is certified that error appears in the above-identified patent and that said Letters Patent is hereby corrected as shown below:

On the Title Page

Item [73], should read "HONDA MOTOR CO., LTD.".

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*